United States Patent

Knoche et al.

[11] 4,026,999
[45] May 31, 1977

[54] PRODUCTION OF IRON (II) CHLORIDE AND CHLORINE FROM FERRIC CHLORIDE

[76] Inventors: Karl-Friedrich Knoche, Kersten Pavillon Lousberg; Helmut Cremer, Boxgraben 79; Gerhard Steinborn, Roermonder Str. 309, all of 51 Aachen, Germany

[22] Filed: Sept. 12, 1975

[21] Appl. No.: 613,001

[30] Foreign Application Priority Data

Sept. 14, 1974  Germany .......................... 2444062

[52] U.S. Cl. .............................. 423/493; 423/500
[51] Int. Cl.² ...................... C01G 49/10; C01B 7/03
[58] Field of Search .......... 423/149, 493, 500, 657; 203/28, 29, 49, 39

[56] References Cited

UNITED STATES PATENTS

| | | | |
|---|---|---|---|
| 2,852,517 | 9/1958 | Lynn | 203/39 |
| 3,842,164 | 10/1974 | Wentorf | 423/657 |
| 3,906,077 | 9/1975 | Rado | 423/149 |

Primary Examiner—Edward J. Meros
Assistant Examiner—Brian E. Hearn
Attorney, Agent, or Firm—Seidel, Gonda & Goldhammer

[57] ABSTRACT

A process is provided for manufacturing iron(II)chloride from iron(III)chloride. Iron(III)chloride is introduced in dimeric form into a reactor or it is vaporized into the dimeric form in the reactor. The dimeric iron(III)chloride vapor rises into the upper part of the reactor where it is completely condensed to the monomeric form. The condensed monomeric iron(III)chloride falls within the reactor to the lower part of the reactor where it is again vaporized. From this reacting circulating system of iron(III)chloride, solid iron(II)chloride is left in the lower part of the reactor. The solid iron(II)chloride is then removed from the reactor.

11 Claims, 1 Drawing Figure

U.S. Patent May 31, 1977 4,026,999
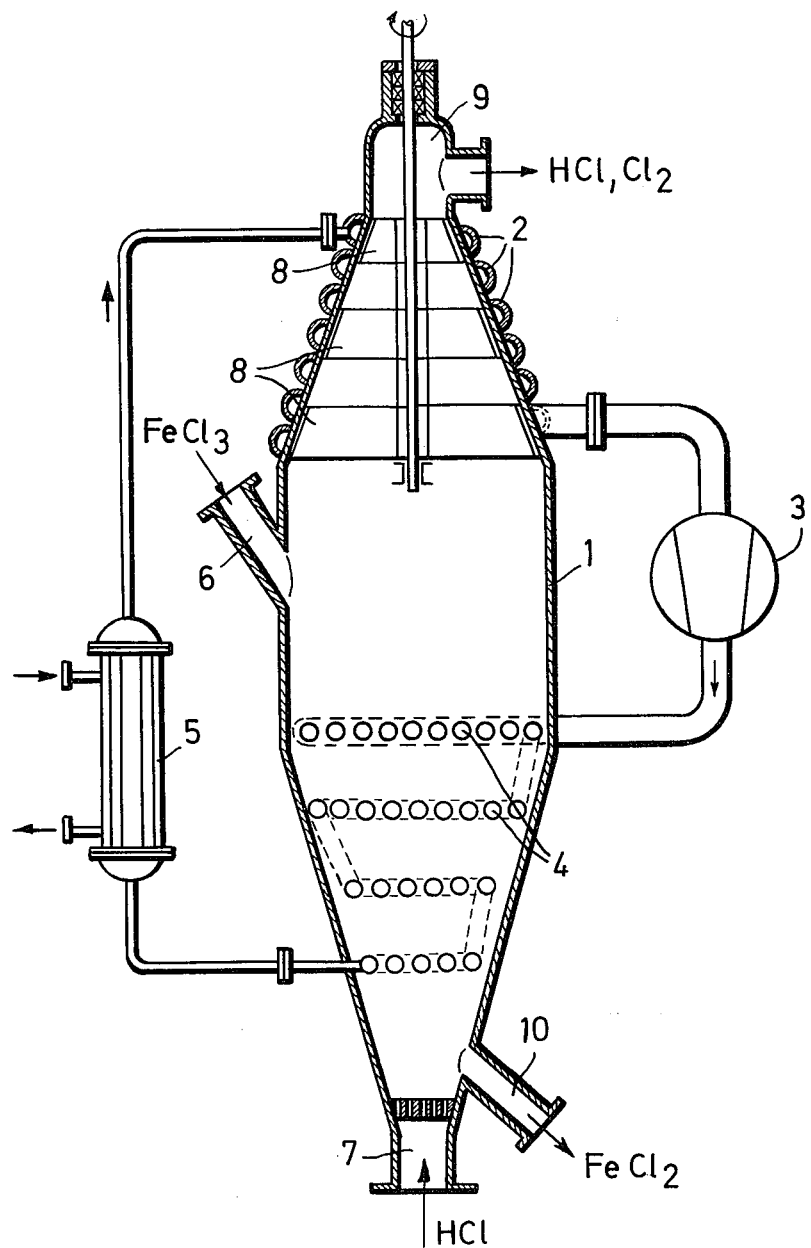

PRODUCTION OF IRON (II) CHLORIDE AND CHLORINE FROM FERRIC CHLORIDE

The invention relates to a method for the manufacture of iron(II)chloride from iron(III)chloride.

It is known to manufacture iron(II)chloride, for example by reacting iron(II/III)oxide with hydrogen chloride at elevated temperatures. Within the field of the recently-developed thermochemical cyclic processes for obtaining hydrogen by the decomposition of water, the iron/chlorine system is preferably used. In these processes, it is an essential step to manufacture iron(II)chloride from iron(III)chloride. Splitting of chlorine from iron(III)chloride by the known method causes considerable technical difficulties however and is very expensive, so that previously no satisfactory process had been developed to the point of technical application.

It has now been found that iron (II) chloride can be manufactured from iron (III) chloride in good yields, if iron(III)chloride is converted in the lower part of a reactor, which is held at a temperature above the melting point of iron(III)chloride, into the dimer form or the latter is introduced into the lower part of the reactor, the rising vapours are completely condensed in the upper part of the reactor at a temperature below the melting point, the monomeric iron(III)chloride so produced is thus returned to the lower part of the reactor, where it is again vaporised and the iron(II)chloride thus formed is removed from the lower part of the reactor. Introduction of the iron(III)chloride into the reactor can take place at any point. It can thus be made directly into the lower part of the reactor. It is also possible however to introduce the iron(III)chloride for example into the upper part of the reactor. The iron(III)chloride thus becomes heated as it falls downwards. Then vaporisation and conversion into the gaseous dimer form take place. This conversion of iron (III) chloride into the dimer form can also take place outside the reactor and the dimer form can be introduced.

The temperature in the lower part of the reactor is preferably held at about 300° to 320° C, when operating under normal pressure, and in iron(III)chloride. other part in the region from about 100° to 300° C. When operating under elevated pressures, e.g. up to 100 atms, these temperature ranges can be extended for instance up to about 850° or 800° C. Temperature regulation can be effected in the usual way e.g. by external heat supply. A circulatory or countercurrent system forms in the reactor between the rising dimeric iron(III)chloride vapours, the possibly still monomeric iron(III)chloride vapours which can also be present and the falling condensed monomeric iron(III)chloride To enhance these movements, an inert carrier gas, e.g. hydrogen chloride, nitrogen or helium, can advantageously be introduced, for instance at the base of the reactor. For example, the iron(III)chloride which may be produced outside the reactor in dimeric form can be introduced by means of the carrier gas. The carrier gas can be preheated in known manner. One possibility for preheating consists in passing the carrier gas from above by way of a dip tube extending into the lower part of the reactor. If required, it can be advantageous mechanically to remove the condensed iron(III)chloride from the walls of the upper part of the reactor, e.g. by means of a circulating scraper. The ratio of iron(III)chloride to carrier gas can be varied over wide limits, approximately from 50:1 to 1:20, though no unnecessarily high excess of gas should be employed.

In general, a ratio of approximately 30:1 to 1:1 is suitable. If operation proceeds under normal pressure, a chlorine concentration of approximately 4 vol% is produced in the rising vapours, depending upon the equilibrium conditions. By condensation of the vapour form dimeric iron(III)chloride in the upper cooler reactor zone, the partial pressure of the chlorine increases sharply. It is of advantage to regulate the concentration of chlorine in the gas mixture of carrier gas and chlorine removed from the head of the reactor to as high a level as possible, e.g. to 60–70 vol% and higher. Separation of the gas mixture can proceed in conventional ways. In particular, when operating under elevated pressure, e.g. 30 to 40 atms, it is also possible to carry out the condensation of the iron(III)chloride so that it is produced in liquid form and then flows back to the lower vaporisation zone. Mobile devices within the reactor can then be dispensed with. The solid iron-(I)chloride formed in the lower part of the reactor can be removed therefrom in known manner, e.g. by means of a screw conveyor. The method according to the invention makes it possible to obtain iron(II)chloride with relatively simple technology and in practically quantitative yields from iron(III)chloride.

In the accompanying drawing, the FIGURE shows diagrammatically one of the possible embodiments of apparatus for manufacturing iron(II)chloride, which naturally can be modified in many different ways.

The reactor 1 is provided with a heat circuit comprising evaporator tubes 4, a compressor 3, condenser tubes 2 and a cooler 5 with ducts connecting these units. By means of this circuit, heat removed from the upper part of the reactor is supplied to the lower part. Monomeric iron(III)chloride is supplied via a line 6 into the reactor and, on falling into the lower part of the reactor heated to approximately 300° to 320° C, is converted to the dimeric form. By means of a carrier gas comprising hydrogen chloride supplied via the inlet 7, the dimeric iron(III)chloride is raised to the upper part of the reactor. This is held at a temperature of about 200° to 290° by means of the heat circuit. The dimeric iron(III)chloride condenses at this temperature and again falls to the lower part of the reactor. any iron(III)chloride precipitating on the reactor walls is removed by means of a scraper device 8. A circulatory system of continuously reacting iron(III)chloride is thus established in the reactor. A mixture of carrier gas and chlorine is removed from an outlet 9, which is then separated into its components in known manner. The solid iron(III)chloride formed in the lower part of the reactor is removed from the reactor via a lower outlet 10.

EXAMPLE

Iron(III)chloride was converted into iron(II)chloride in an apparatus according to the accompanying FIG. 1 kmol $FeCl_2$ and ½ kmol $Cl_2$ were obtained per kmol $FeCL_3$. 0.7 Kmol/h HCL was supplied as the carrier gas. The chlorine content of the gas mixture leaving reactor was adjusted to 70 vol%. The temperature in the lower part of the reactor was approximately 320° C and that in the upper part was approximately 280° C. In the heat circulatory system, approximately 188 kg vapour per kmol $FeCL_3$ was circulating at a pressure of approximately 160 atms and with a maximum temperature of approximately 360° C.

We claim:

1. A method for manufacturing iron(II)chloride from iron(III)chloride comprising supplying iron(III)chloride to a reactor whereby the dimeric form of iron(III)chloride is eventually introduced into the upper part of said reactor, completely condensing the dimeric iron(III)chloride in said upper part by cooling it to a temperature below the melting point of iron(III)chloride thereby producing the monomeric form of iron(III)chloride, said monomericiron(III)chloride falling to the lower part of said reactor, maintaining said lower part at a temperature above the melting point of iron(III)chloride, evaporating monomeric iron(III)chloride in said lower part to the dimeric form of iron iron(III)chloride thus forming within the reactor a continuously reacting circulating system of falling monomeric iron(III)chloride and rising dimeric iron(III)chloride vapors, said continuously reacting system of iron(III)chloride yielding solid iron(II)chloride in said lower part and chlorine gas, and removing said solid iron(II)chloride from said lower part.

2. A method according to claim 1 wherein said iron(III)chloride is supplied to said lower part of said reactor.

3. A method according to claim 2 wherein said iron(III)chloride is supplied in an inert carrier gas.

4. A method according to claim 3 wherein said carrier gas comprises hydrogen chloride.

5. A method according to claim 3 wherein said carrier gas is preheated.

6. A method according to claim 2 wherein said is supplied in dimeric form in an inert carrier gas.

7. A method according to claim 2 wherein said supplied iron(III)chloride is converted in said lower part to the dimeric form by heating at a temperature above the melting point of iron(III)chloride.

8. A method according to claim 1 wherein said iron(III)chloride is supplied directly to said upper part of said reactor.

9. A method according to claim 8 wherein said iron(III)chloride is converted to the dimeric form outside said reactor and is supplied to said upper part in dimeric form.

10. A method according to claim 8 wherein said iron(III)chloride is heated as it falls downward from said upper part and is then vaporized and converted to the gaseous dimeric form.

11. A method according to claim 1 wherein said reactor is operated at elevated pressures and said iron(III)chloride is condensed to liquid form.

* * * * *